United States Patent
Peatross et al.

(10) Patent No.: US 6,834,968 B2
(45) Date of Patent: Dec. 28, 2004

(54) TELEPROMPTER WITH DIRECTIONAL SCREEN

(75) Inventors: Justin Peatross, Provo, UT (US); Michael Ware, Provo, UT (US); Robert H. Todd, Provo, UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 09/957,679

(22) Filed: Sep. 19, 2001

(65) Prior Publication Data

US 2002/0075461 A1 Jun. 20, 2002

Related U.S. Application Data

(60) Provisional application No. 60/234,190, filed on Sep. 20, 2000.

(51) Int. Cl.[7] .................. G03B 21/00; G03B 21/14; G03B 21/26; G03B 21/08; G02B 27/22
(52) U.S. Cl. ................ 353/122; 353/10; 353/20; 353/30; 353/63; 359/478; 359/630; 472/58; 472/61; 472/63; 348/61; 348/375; 348/722
(58) Field of Search ................ 353/10, 28, 30, 353/63; 359/478, 629, 630; 472/58, 61, 63; 348/61, 373, 375, 722, 14.16; 352/55, 90

(56) References Cited

U.S. PATENT DOCUMENTS

| | | | | |
|---|---|---|---|---|
| 4,730,218 A | * | 3/1988 | Goodrich | 348/722 |
| 5,373,333 A | * | 12/1994 | Kawada et al. | 353/122 |
| 5,620,245 A | * | 4/1997 | Kobayashi et al. | 353/28 |
| 6,280,039 B1 | * | 8/2001 | Barber | 353/119 |
| 6,290,359 B1 | * | 9/2001 | Shriver | 353/28 |
| 6,375,326 B2 | * | 4/2002 | Myers | 353/10 |
| 6,467,913 B1 | * | 10/2002 | Holden et al. | 359/530 |

* cited by examiner

Primary Examiner—Russell Adams
Assistant Examiner—Magda Cruz
(74) Attorney, Agent, or Firm—Thorpe North & Western, LLP

(57) ABSTRACT

A teleprompter configured to project an image to a viewer at a viewer location comprises a single-beam teleprompter projector, configured to project an image to a focal plane, and a directional screen, disposed at the focal plane. The directional screen is configured to direct the image to a focal point at the viewer location, and diffuse the image within a limited viewing region surrounding the focal point, such that the apparent brightness of the image to the viewer at the viewer location is increased, and the visibility of the image to persons other than the viewer is reduced. Because the device concentrates the light at the viewer, it can be made much larger than conventional video monitors typically used in speech-prompter settings, while still maintaining very high brightness.

20 Claims, 2 Drawing Sheets

TELEPROMPTER WITH DIRECTIONAL SCREEN

This application claims priority from U.S. Provisional Application Serial No. 60/234,190, filed on Sep. 09, 2000, entitled "Directional Screen for use in a Teleprompter."

BACKGROUND OF THE INVENTION

1. Field of the Invention

The present invention relates to the field of teleprompters. More specifically, the present invention relates to a teleprompter having a directional screen which may be viewed from a limited range of angles, such that when one individual views the teleprompter, those to the sides of the viewer cannot view the text meant for the viewer.

2. Related Art

The recent development of compact and affordable single-beam video projectors enables the implementation of a highly directional speech-prompting system with unprecedented brightness. Standard rear projection video systems often employ a fresnel lens at the screen to collimate the light before imposing a relatively high degree of diffusion. This ensures that viewers observing from a wide range of angles see a screen that is uniformly lit. In an effort to increase brightness for an audience distributed more or less in a horizontal plane in front of the screen, special prism-lens diffusers have been developed, which scatter the light side to side in a room, but avoid the wasteful scattering of light towards the ceiling or the floor.

SUMMARY OF THE INVENTION

In accordance with one aspect of the present invention, the invention provides a teleprompter configured to project an image to a viewer at a viewer location. The teleprompter comprises a single-beam teleprompter projector, configured to project an image to a focal plane, and a directional screen, disposed at the focal plane. The directional screen is configured to direct the image to a focal point at the viewer location, and diffuse the image within a limited viewing region surrounding the focal point, such that the apparent brightness of the image to the viewer at the viewer location is increased, and the visibility of the image to persons other than the viewer is reduced.

Additional features and advantages of the invention will be apparent from the detailed description which follows, taken in conjunction with the accompanying drawings, which together illustrate, by way of example, features of the invention.

DETAILED DESCRIPTION

Figure 1:
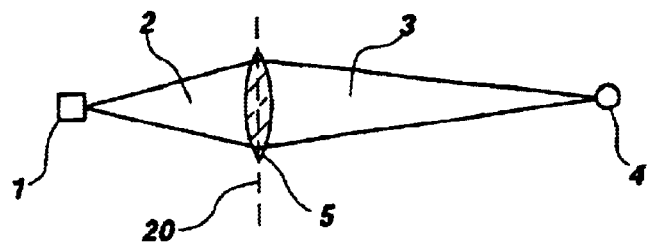
FIG. 1 illustrates the basic elements of the system design.

For purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The inventors have developed an apparatus to limit the viewing-angle of the screen in both the vertical and horizontal dimensions. Rather than rely solely on a special directional diffuser at the screen, we adjust the distance between the projector and the lens-screen so that the light converges to a single viewer positioned in front of the lens. This approach restricts the range of angles from which the screen can be viewed. In a normal viewing environment this would be undesirable. However, in applications where the screen is used for prompting speeches this design has several advantages. First, it makes it so that other people near the speaker are less able to read the screen. Second, because the light is concentrated at the speaker, it is easily bright enough to be viewed from the reflection of an uncoated tempered piece of glass. This reduces the glare from the glass for audience members (or cameras) who look through the glass to see the speaker. The increased brightness also allows for the construction of large speech prompters, which may be placed 10 meters or even more from the speaker.

The basic elements of the system design are depicted in FIG. 1. A compact projector 1 produces a focused image precisely on a large fresnel lens 5, which is disposed at a focal plane 20 and serves as a directional screen. The projector distance 2 ($d_o$) is adjusted such that the lens-viewer distance 3 ($d_i$) satisfies the imaging relation:

$$(1/f)=(1/d_o)+(1/d_i) \qquad (1)$$

where f is the focal length of the lens. The concentrated light source at the projector is imaged to the position of the viewer 4. Thus, very little light is wasted.

A separate imaging relation is relevant to the image perceived by the viewer. The projector 1 produces a focused pattern right on the lens 5. (e.g. text for the viewer to read). Treating this pattern as an object with distance $d_o \cong 0$ from the lens, its image appears also at $d_i \cong 0$, according to (1). This means that the viewer 4 sees the pattern clearly at the location of the lens 5. The lens 5 thus functions as a highly directional screen. This approach can also be implemented with a concave mirror instead of a lens, although in this case the projector light would need to arrive at the mirror at near normal incidence to the extent required by the keystone adjustment of the projector and/or the off-axis prescription of the mirror.

Figure 2:
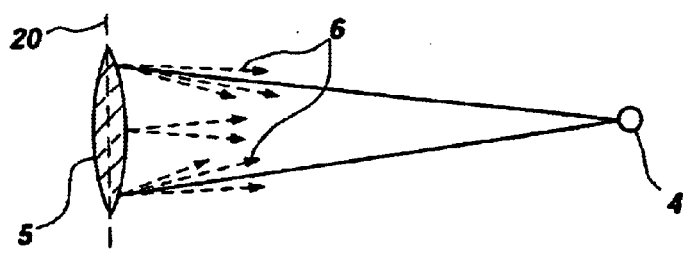
FIG. 2 illustrates subtle diffusion of the lens.

In the idealized scenario described above, the viewer 4 must be at a specific location to simultaneously see the rays from all parts of the pattern at the lens 5. This restricts the movement of the viewer and can lead to the appearance of "hot spots," which occur if the viewer 4 shifts location even slightly, so that he or she receives rays preferentially from only a part of the lens-screen 5. Therefore, a subtle amount of diffusion should be added to the lens so that a narrow ray packet 6 emerges from each point of the pattern. This is depicted in FIG. 2. The viewer 4 then has a range of positions for which each part of the pattern at the lens-screen 5 is uniformly bright. Care should be taken not to introduce too much diffusion, or the desired effect of the limited-angle viewing and increased brightness are diminished.

We have constructed several working devices based on the principles discussed in the previous paragraphs. The largest unit employs a fresnel lens 5 with focal length f=2.2 meters, manufactured by DNP, Inc., Denmark. The distance 2 from the projector 1 to the lens-screen 5 is $d_o$=2.7 meters. This places the viewing location at a distance 3 $d_i$=12 meters after the lens-screen 5, according to (1). Although the imaging properties of a fresnel lens are greatly inferior to those of a polished glass lens, it has the advantages of being thinner, much lighter in weight, and cost effective. Nevertheless, a polished glass lens could be used. The intrinsic scatter of the light by the fresnel lens for the most part is within the range of diffusion needed to eliminate hot spots as discussed above. A fresnel lens does tend to scatter a modest fraction of light into much wider angles, but the intensity is down a factor of 100 or more at wide angles.

In general, to retain the brightness of the image while still enlarging the region in which the image is viewable, the inventors have found that the appropriate amount of diffusion spreading should be from about 0' to about 10' each side of the line of projection of the image. An angle of about 4' each side of the line of projection of the image provides very good results, and an angle of 8' is also acceptable. An appropriate amount of diffusion was introduced with a layer of Hamburg Frost #414, produced by Dupont. This thin translucent material is typically used to cover theater lights to introduce a soft diffusion effect. As shown in the detail view in FIG. 3, a single layer 21 of Hamburg Frost material was placed against the exiting surface of the fresnel lens with the dull side of the diffusion material away from the lens. Other methods of achieving optimal diffusion are possible such as applying a fine buff finish to the lens itself, which in this case is made of a polymer. It should be mentioned that the DNP fresnel lens 5 is manufactured with a small amount of inherent diffusion, but this amount of diffusion is insufficient for optimal results in the present application.

Figure 3:
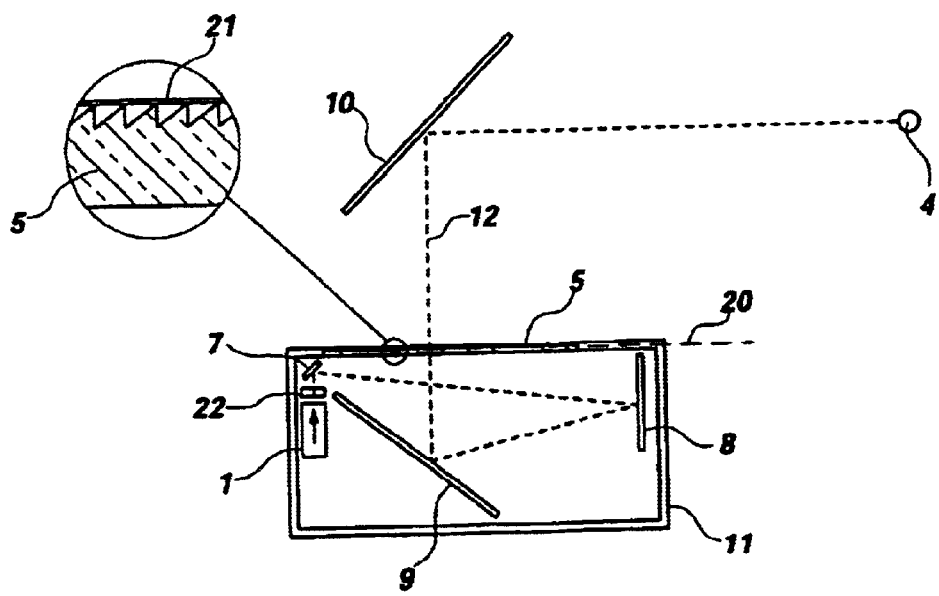
FIG. 3 is a cross-sectional view of one embodiment of the invention.
Figure 4:
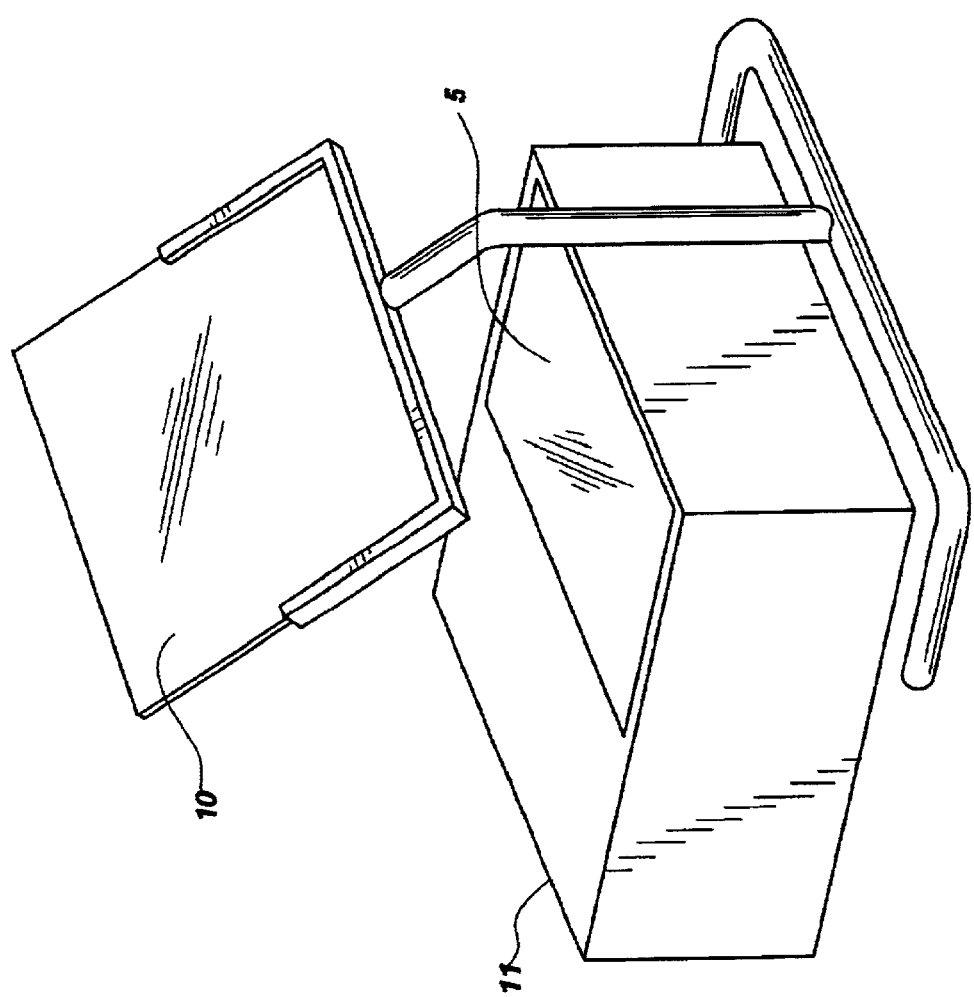
FIG. 4 is a perspective view of the embodiment of FIG. 3.

FIG. 3 depicts the implementation of the device, which has been used successfully in a professional setting. Flat mirrors 7, 8, and 9 are utilized within the device in a standard fashion to make the enclosure 11 as compact as possible. The optical path of the image from the projector 1 to the viewer location 4 is depicted by a dashed line 12. We have employed 3 mm thick rear surface mirrors except for the small mirror 7 near the projector, which is a first-surface mirror. The final large mirror 9 does produce a small degree of ghosting, owing to reflections from its first surface, but this was not noticeable at normal viewing distances. The preferred dimensions of the system are 80 cm high by 170 cm long by 140 cm wide. The housing frame 11 is constructed of square aluminum tubing surrounded by aluminum enclosure panels. It can be stood on end and rolled into place with castors (not shown)

The lens-screen 5 was cut to a diagonal of 160 cm (with standard 3:4 aspect ratio). For use as a speech prompter, the device is placed with the screen facing upwards as shown in FIG. 3. The speaker 4 views the screen from the reflection off a large plate of glass 10 suspended above the device. Because of the high brightness of the device, a simple uncoated piece of tempered glass 6 mm thick can be used for this purpose. In this case, light reflects from both the front surface and the back surface of the glass plate 10 for a total of about 12% of the original light (unpolarized). The resulting dual images arising from the two reflections are separated by 4 mm, which is on the scale of the resolution limit of the human eye at 10 meters. Therefore, the fact that there are really two images is unnoticed.

Even with only 12% of the light directed towards the speaker 4 from the glass plate 10, for indoor use, we found it necessary to further attenuate the light from the projector 1 using a neutral density filter 22 (Schott NG-5 filter, 3 mm thick) placed in the light stream very close to the projector. This filter allowed only 19% of the available light from the projector 1 to reach the glass plate when used indoors.

We also examined the performance of the device outdoors on a bright sunny day. In this case, we found it necessary to use all available light (800 lumens) from the projector (Sharp model XG-NV7XU). We also employed a glass plate 10 coated with a 40% reflective coating (as opposed to the 12% plate used indoors). In this test we found the text to be very readable even with bright background scenery. Standard speech prompters are generally too dim to be used in bright sunlight. The fact that this new unit can work outdoors while also being so large makes it especially novel. Scaling the design to a smaller size increases the brightness, making it possible to use the inexpensive uncoated glass plate outdoors. Using a more powerful projector would also allow the use of an uncoated glass reflector outdoors.

The directionality of the device is related to the fact that the viewable image is so bright. At a distance of 12 meters from the lens-screen, the region of good visibility is about 1 meter wide. This represents a diffusion angle of from about 4° to about 8° each side of the line of projection of the image. Outside of this region, the brightness diminishes gradually with increasing angle until the pattern is unreadable about 3 meters away from center, having a brightness reduced by a factor of about 100.

It is important that the projector produce un-polarized light (liquid crystal projectors produce polarized light). If the light is polarized in the plane of incidence of the reflections from the mirrors 7, 8 and 9 or the glass plate 10, the reflectivity can be wavelength dependent, and this can alter the color of the pattern. A projector producing polarized light can be used if the polarization is not in an incompatible plane. The Sharp projector model XG-NV7XU that we used relies on micro-mirror technology, which avoids this problem, since the light emerges from the projector un-polarized.

Most projectors have a default keystone setting intended to allow the light from the projector to strike the screen at an angle in the range of 15–20 degrees. We relied on a keystone adjustment feature of the projector 1 to enable the projected light to strike the lens-screen 5 at normal incidence.

We designed and implemented smaller speech-prompter units with a lens-screen diagonal of 95 cm. This smaller version, which has also performed very well in a professional setting, utilizes a DNP fresnel lens with a focal length f=1.7 meters. The projector-screen distance 2 was set to $d_o$=2.0 meters, which was the maximum allowed by our projector 1 without overfilling the screen. This resulted in an optimal speaker distance 3 of $d_i$=11 meters, dictated by (1), which was longer than desired for the smaller units. When in use, the speaker 4 was located at only 5 meters, but the performance of the device was still very acceptable. In this case, a second layer of Hamburg Frost diffuser (not shown) was added to the screen 5 to compensate for the speaker 4 being out of position. A fresnel lens with a shorter focal length would have been ideal, but this was unavailable. The same filter (not shown) (Schott NG-5, 3 mm thick) had to be placed in the projector beam to avoid being too bright indoors.

As was mentioned, projectors usually have a built in amount of keystone intended for projection onto the screen at an angle. We took advantage of this feature in the smaller speech prompter units by using the fresnel lens off-axis. We cut a single fresnel lens down the center and utilized the fragments of a single lens in two separate units. By causing the projector light to impinge on the lens-screen 5 off-axis, that is, at a 12 degree angle (not shown), rather than normal to the lens, this compensated for the effects of using only half a lens, and the light emerged from the lens-screen 5 at normal incidence.

We have developed a speech-prompter system with the clear advantages of increased brightness coupled with limited viewing angle. The system utilizes a standard compact computer projector and has sufficient brightness for outdoor use. Because it does not involve a picture tube, but only flat mirrors and a light weight fresnel lens, one can envision a portable version that could collapse to suitcase size. The device may be useful in a variety of settings where bright, yet limited-angle viewing might be desirable (e.g. traffic signs or signals intended to be viewed from a specific location, such as a single lane of traffic.)

The present invention may be embodied in other specific forms without departing from its structures, methods, or other essential characteristics as broadly described herein and claimed hereafter. The present apparatus may be used in other applications as would be known to one skilled in the art. The described embodiments are to be considered in all respects only as illustrative, and not restrictive. The scope of the invention, is, therefore, indicated by the appended claims, rather than by the foregoing description. All changes that come within the meaning and range of equivalency of the claims are to be embraced within their scope.

It is to be understood that the above-described arrangements are only illustrative of the application for the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A teleprompter, configured to project an image to a viewer at a viewer location, comprising:
   a single-beam teleprompter projector, configured to project an image to a focal plane;
   a single lens, disposed at the focal plane, configured to direct the image to the viewer location, and diffuse the image within a limited viewing region surrounding the viewer location, such that the apparent brightness of the image to the viewer at the viewer location is increased, and the visibility of the image to persons not at the viewer location is reduced.

2. A teleprompter as in claim 1, further comprising a reflector, disposed between the directional screen and the viewing location, configured for redirecting the light image, such that the projector, lens, and viewer location are not in a substantially straight line.

3. A teleprompter as in claim 2, wherein the reflector comprises a piece of substantially transparent glass, and the apparent brightness of the image is sufficient to allow viewing in broad daylight.

4. A teleprompter as in claim 2, wherein the reflector comprises glass with a reflective coating.

5. A teleprompter as in claim 1, wherein the single lens is treated to increase diffusion, such that the viewer has a range of positions in the viewing region for which each part of the image is substantially uniformly bright.

6. A teleprompter as in claim 5, wherein the single lens is a fresnel lens.

7. A teleprompter as in claim 5, wherein the single lens diffuses the image in the range of from about 0° to about 10° relative to a line of projection of the image.

8. A teleprompter as in claim 7, wherein the single lens diffuses the image about 4° relative to the line of projection of the image.

9. A teleprompter as in claim 5, wherein the treatment to increase diffusion is selected from the group consisting of: the addition of a diffusion layer to the single lens; and buffing the single lens.

10. A teleprompter as in claim 1, further comprising a neutral density filter associated with the teleprompter projector, configured to reduce the intensity of the projected light image.

11. A teleprompter as in claim 1, further comprising a housing, containing the projector and the single lens, the projector and the directional screen being optically disposed a projector distance from each other.

12. A teleprompter as in claim 11, further comprising a plurality of mirrors, physically disposed within the housing and optically disposed between the teleprompter projector and the single lens, the mirrors configured to redirect the light image between the projector and the single lens, such that the physical distance between the single lens and the projector is less than the projector distance.

13. A system for projecting an image to a viewer at a viewer location, comprising:
   a teleprompter projector for projecting an image;
   a viewer location; and
   a single lens, having focal and diffusive properties, optically disposed between the projector and the viewer location, upon which the image from the projector is projected, configured to substantially focus the image to a limited viewing region surrounding the viewer location, such that the brightness of the image when viewed from the viewer location is increased, and the visibility of the light image when viewed from a position away from the viewer location is reduced.

14. A system as in claim 13, wherein the single lens comprises a fresnel lens which has been treated to increase diffusion, such that the viewer has a range of positions in the viewer region for which each part of the image is substantially uniformly bright.

15. A system as in claim 14, wherein the fresnel lens diffuses the image in the range of from about 0° to about 10° relative to a line of projection of the image.

16. A system as in claim 13, further comprising:
   a substantially transparent reflector, disposed between the single lens and the viewer location, configured for redirecting the image, such that the projector, lens, and viewer location are not in a substantially straight line; and
   wherein the apparent brightness of the image is sufficient to allow viewing in broad daylight.

17. A system as in claim 16, further comprising a housing, containing the projector and the single lens, and wherein the reflector is disposed substantially above the housing.

18. A system as in claim 13, wherein the projector is configured to project a non-polarized image.

19. A teleprompter, comprising:
- a single-beam teleprompter projector, configured to project an image to a focal plane;
- a viewer location;
- a single fresnel lens, disposed at the focal plane, configured to direct the image to the viewer location, and to diffuse the image within a limited viewing region surrounding the viewer location, such that the apparent brightness of the image to a viewer at the viewer location is increased, and the visibility of the image to persons not at the viewer loction is reduced; and
- a reflector, disposed between the fresnel lens and the viewer location, configured to redirect the image, such that the projector, lens, and viewer location need not be in a substantially straight line.

20. The teleprompter of claim 19, wherein the reflector comprises a piece of substantially transparent glass, and the apparent brightness of the image is sufficient to allow viewing in broad daylight.

* * * * *